United States Patent Office 3,408,394

Patented Oct. 29, 1968

3,408,394
PROCESS FOR PREPARATION OF DITHIOOXAMIDE

Paul D. Schickedantz, St. Albans, W. Va., assignor to Union Carbide Corporation, a corporation of New York No Drawing. Filed Aug. 17, 1965, Ser. No. 480,514
7 Claims. (Cl. 260—551)

ABSTRACT OF THE DISCLOSURE

Dithiooxamide is prepared in high yield by adding a cupric tetrammine salt to a cyanide salt in an aqueous alcoholic reaction medium at a temperature in the range of from about −5° C. to about 50° C. and treating the resulting reaction mixture with a sulfide. A typical example involves the controlled addition at a slow rate of an aqueous solution of cupric tetrammine sulfate to a solution of sodium cyanide in a mixture of ethanol and water, followed by treatment with hydrogen sulfide to effect precipitation of dithiooxamide.

This invention relates to the preparation of dithiooxamide. More particularly, this invention relates to a novel process for preparing dithiooxamide in high yield and in a commercially feasible manner comprising reaction of a cupric tetrammine salt with a cyanide salt and treatment of the reaction product with a sulfide to precipitate dithiooxamide.

Dithiooxamide, or as it is more commonly called, rubeanic acid, is a well known compound having particular utility as an analytical reagent. Conventional processes for preparation of dithiooxamide utilize gaseous cyanogen and a number of different procedures of this type are known. All share in the common disadvantages which stem from the high cost and intractable nature of gaseous cyanogen. It has also been known for many years that dithiooxamide can be prepared by reaction of ammoniated cupric sulfate with potassium cyanide [Formanek, J., Ber., 22, 2655 (1889)]. The known procedure involves the slow addition of aqueous potassium cyanide to a solution of ammoniated cupric sulfate until the solution becomes colorless, followed by treatment with hydrogen sulfide to precipitate dithiooxamide. Very low yields of product result, for example, a yield on the order of about 20 percent based on copper. This low yield and the added problems of disposal of the used copper and cyanide render the process unsuitable for commercial operation.

It is the general object of this invention to provide a novel process for the preparation of dithiooxamide which overcomes the aforementioned difficulties of the prior art processes. Specifically, it is an object of this invention to provide a novel process for preparing dithiooxamide in high yield. A further object of this invention is to provide an economical and commercially feasible process for producing dithiooxamide wherein loss of starting materials is minimized. These and other objects and advantages of the invention will become apparent to one skilled in the art in light of the following detailed disclosure and appended claims.

This invention is based on the discovery that greatly improved yields of dithiooxamide can be obtained through use of a process comprising addition of a cupric tetrammine salt to a cyanide salt in the presence of an alcohol, and subsequent treatment of the reaction mixture with a sulfide to precipitate dithiooxamide. It was an unexpected and surprising result to find that addition of the cupric tetrammine salt to the cyanide salt, as contrasted with the prior art procedure of adding the cyanide salt to the cupric tetrammine salt, greatly enhances the yield. It was also unexpected and surprising to find that even greater improvement in the yield is achieved through incorporation of a suitable alcohol in the reaction mixture. While applicant does not intend to be bound by any theoretical considerations, it is believed that the presence of the alcohol in the reaction mixture leads to the formation of cyanoformimidate and oxalimidate intermediates which in turn react with the sulfide to bring about an enhanced yield of dithiooxamide.

More specifically, the process of this invention preferably comprises the steps of adding a solution of a cupric tetrammine salt in water, in a slow and controlled manner and at a moderate temperature, to a solution of a cyanide salt in a mixture of water and alcohol, the relative amounts of the two solutions being selected to give a suitable molar ratio of cupric to cyanide ion, as hereinafter described in greater detail, then treating the admixture with an effective amount of a sulfide to effect precipitation of dithiooxamide, and finally recovering the dithiooxamide by filtering or other suitable technique. In a preferred embodiment of the invention, the mother liquor remaining after recovery of the dithiooxamide is subjected to suitable treatment to effect recovery and re-use of the copper and cyanide.

The cupric tetrammine salts of utility for the purposes of this invention are compounds of the formula:

$$[Cu(NH_3)_4](X)_n$$

wherein X is sulfate ($SO_4^=$), nitrate ($NO_3^-$), bromide ($Br^-$), chloride ($Cl^-$) or acetate ($CH_3-CO_2^-$) and $n$ is 1 when X is sulfate and otherwise is 2. Thus, the suitable cupric tetrammine salts include cupric tetrammine sulfate, cupric tetrammine nitrate, cupric tetrammine bromide, cupric tetrammine chloride and cupric tetrammine acetate. The cupric tetrammine salts are readily prepared by reaction of ammonia with a cupric salt of the formula $Cu(X)_n$ and are utilized in the process of this invention in the form of an aqueous solution containing at least about 0.05 part of cupric tetrammine salt per part of water by weight, and preferably at least about 0.1 part. The upper limit on the concentration of cupric tetrammine salt will be determined by the solubility of the particular salt involved and saturated solutions of the salt may suitably be employed.

The cyanide salt which is reacted with the cupric tetrammine salt described above may be ammonium cyanide ($NH_4CN$) or an alkali metal cyanide, i.e. sodium cyanide (NaCN), potassium cyanide (KCN), lithium cyanide (LiCN), cesium cyanide (CsCN) or rubidium cyanide (RbCN). It is particularly convenient to utilize the cyanide salt in the form of an aqueous solution containing the necessary alcohol, to which solution the aqueous solution of cupric tetrammine salt is added to effect the reaction. The suitable alcohols for preparation of the aqueous alcoholic solution of the cyanide salt are water-miscible lower alkanols of 1 to 4 carbon atoms, e.g. methanol, ethanol, n-propanol, isopropanol, t-butanol, or mixtures thereof, while the solution should contain from about 0.1 to about 5 parts of alcohol and about 0.1 to about 1 part of cyanide salt per part of water by weight. It is preferred to employ about 0.3 to about 0.7 part of alcohol and about 0.3 to about 0.7 part of cyanide salt per part of water by weight.

In accordance with this invention, the aqueous cupric tetrammine salt solution is added to the aqueous alcoholic cyanide salt solution over a period of about 20 to about 100 minutes, while maintaining the temperature of the admixture in the range from about −5° C. to about 50° C. It is preferred that the admixing of the two solutions be completed in a period of about 30 to about 60 minutes and at a temperature of about 5° C. to about 15° C. The aqueous cupric tetrammine salt solution and aqueous alcoholic cyanide salt solution should be combined in a proportion providing a molar ratio of cupric to cyanide ion of from about 0.1 to about 1, more preferably from about 0.2 to about 0.3.

Reaction between the cupric tetrammine salt and the cyanide salt is rapid and it is preferred to treat the reaction mixture almost immediately with the sulfide, i.e. within less than about 1 minute after addition of the cupric tetrammine salt is completed, but the process is operative even though a period of up to about 60 minutes, or more, is permitted to elapse before treatment with the sulfide.

The dithiooxamide may be precipitated directly by treating the reaction mixture with hydrogen sulfide ($H_2S$) or ammonium sulfide ($(NH_4)_2S$). Alternatively, the reaction mixture may be treated with sodium hydrosulfide (NaHS) or potassium hydrosulfide (KHS) and then acidified to precipitate the dithiooxamide. In either case, the amount of sulfide employed should be sufficient to provide a molar ratio of sulfide to cupric ion of from about 1.2 to about 3, more preferably from about 1.4 to about 1.8. Treatment with the sulfide is suitably effected at temperatures within the same range as previously disclosed for admixture of the aqueous cupric tetrammine salt solution and aqueous alcoholic cyanide salt solution, i.e. temperatures from about −5° C. to about 50° C. and preferably from about 5° C. to about 15° C.

Where a hydrosulfide is employed, the reaction mixture should be permitted to stand for about 1 to about 60 minutes, more preferably from about 15 to about 25 minutes, before acid is added to precipitate the dithiooxamide. It is preferred that the acidification be effected by addition of sulfuric acid, but any acid having a $K_a$ value (the ionization constant in water at 25° C.) of greater than $3\times10^{-10}$ may be employed, for example, hydrochloric acid, phosphoric acid, nitric acid, acetic acid, carbonic acid, and the like. Sufficient acid should be added to bring the pH of the solution to a value of from about 9 to about 10.

Upon precipitation, the dithiooxamide may be recovered by filtering, then thoroughly washed with water to ensure that it will be free from discoloration, and finally dried with air or nitrogen. During the initial admixing of the aqueous cupric tetrammine salt solution and the aqueous alcoholic cyanide salt solution a precipitate of hydrated alkali metal salt may be formed, but this has no adverse effect and contamination of the dithiooxamide therewith may be readily avoided by heating the reaction mixture to dissolve this salt before filtering the precipitated dithiooxamide.

In a preferred embodiment of this invention, the copper and cyanide are recovered and recycled. This can be readily accomplished by treating the mother liquor remaining after recovery of the dithiooxamide with a non-oxidizing acid at a temperature of about 0° C. to about 60° C. in an amount sufficient to provide an equivalents ratio of acid to cuprous ion of from about 2.5 to about 3.5, to thereby precipitate cuprous salts, primarily cuprous sulfide. Suitable acids for this purpose are the non-oxidizing acids having a $K_a$ value of greater than $9\times10^{-8}$, for example, sulfuric acid, hydrochloric acid, phosphoric acid, acetic acid, and the like. The cuprous salts are then slurried with a small amount of water, for example, a molar ratio of water to cuprous ion of about 0.25 to about 6, heated to reflux, and then oxidized by treatment with an oxidizing acid, for example, nitric acid or perchloric acid, at a temperature of about 20° C. to about 100° C., or by treatment with oxygen in the presence of excess ammonia. This results in the liberation of nitric oxide gas and the formation of a solution of cupric sulfate and cupric nitrate, which is recycled for use in preparing the cupric tetrammine salts employed as reactants in the process of this invention. The amount of oxidizing acid employed is dependent upon the valence change in the oxidant; with nitric acid, for example, a molar ratio of acid to cuprous ion of about 1.5 to about 3 is suitable.

Treatment of the mother liquor with a non-oxidizing acid to precipitate cuprous salts, as described above, results in formation of both hydrogen sulfide and hydrogen cyanide. The hydrogen sulfide, being much less soluble in the mother liquor than the hydrogen cyanide, is liberated in the gaseous form while the hydrogen cyanide may be recovered along with water and alcohol by distillation of the mother liquor. The hydrogen cyanide thus recovered is then absorbed in aqueous alkali, i.e. ammonium hydroxide or alkali metal hydroxide, to form the cyanide salt which is recycled and used to prepare the aqueous alcoholic cyanide salt solution employed as a reactant in the process of this invention.

The invention is further illustrated by the following specific examples of its practice.

EXAMPLE 1

A solution of 25 grams (0.1 mole) of cupric sulfate pentahydrate in 75 milliliters of water was treated with 22 grams (0.4 mole) of 30 percent aqueous ammonia until the first formed precipitate just dissolved, thereby forming an aqueous solution of cupric tetrammine sulfate. This solution was then added slowly with stirring, while maintaining a temperature of 10 to 15° C., to 201.6 grams of a solution consisting of 9.7 weight percent sodium cyanide (0.4 mole), 25.8 weight percent ethanol, and 64.5 weight percent water. After the addition was complete, hydrogen sulfide was bubbled into the solution until no more precipitate formed. The precipitate was recovered by filtering, washed thoroughly with water, and dried to give a yield of 4.6 grams of dithiooxamide (76.8 percent yield based on copper).

In contrast with the above result, where the order of addition of the aqueous cupric tetrammine salt solution and aqueous alcoholic cyanide salt solution was reversed the yield of dithiooxamide was substantially reduced. Thus, two solutions substantially identical to those described above were prepared and the sodium cyanide solution was added slowly at 10 to 15° C. to the cupric tetrammine sulfate solution and then hydrogen sulfide was bubbled into the solution until no more precipitate formed. The yield of dithiooxamide was 3.4 grams (56.5 percent yield based on copper).

In further contrast with the above results, where the alcohol was omitted from the cyanide salt solution so that the procedure then corresponded to that of the prior art, the yield of dithiooxamide was substantially further reduced. Thus, an aqueous cupric tetrammine sulfate solution identical to that described above was prepared and then 100 grams of a 33 weight percent aqueous solution of potassium cyanide was slowly added thereto at 10 to 15° C. After the addition was complete, hydrogen sulfide was bubbled into the solution until no more precipitate formed. The yield of dithiooxamide was 1.2 grams (20 percent yield based on copper).

EXAMPLE 2

A solution of 25 grams (0.1 mole) of cupric sulfate pentahydrate in 75 milliliters of water was treated with 22 grams (0.4 mole) of 30 percent aqueous ammonia until the first formed precipitate just dissolved, thereby forming an aqueous solution of cupric tetrammine sulfate. This solution was then added slowly with stirring, while maintaining a temperature of 5 to 10° C., to 201.6 grams of a solution consisting of 9.7 weight percent sodium cyanide (0.4 mole), 25.8 weight percent ethanol, and 64.5 weight percent water. After the addition was complete, 86 grams of a 10.6 percent aqueous sodium hydrosulfide solution (0.163 mole NaHS) was added, the solution was permitted to stand for 20 minutes, and then carbon dioxide was bubbled into the solution until no more precipitate formed. The precipitate was recovered by filtering, washed thoroughly with water, and dried to give a yield of 4.3 grams of dithiooxamide (71.8 percent yield based on copper).

EXAMPLE 3

A solution of 250 grams (1 mole) of cupric sulfate pentahydrate in 750 milliliters of water was treated with ammonia gas (4 moles) until the first formed precipitate dissolved to give a deep blue solution, thereby forming an aqueous solution of cupric tetrammine sulfate. This solution was then added with stirring over a period of 60 minutes, while maintaining the temperature at 8 to 11° C., to 211 grams of 95 percent pure sodium cyanide (4.1 moles NaCN) dissolved in 300 grams of methanol and 500 grams of water. There was then added 120 grams of 75.8 percent pure sodium hydrosulfide (1.62 moles NaHS) dissolved in 100 grams of water. The reaction mixture was then permitted to stand for 20 minutes while maintaining the temperature at 8 to 11° C., whereupon 104.5 grams (1 mole) of concentrated sulfuric acid was slowly added with cooling and stirring to lower the pH to 10 and cause dithiooxamide to precipitate. The reaction mixture was then warmed to about 30° C. to melt the solid sodium sulfate decahydrate that had formed and the dithiooxamide was recovered by filtration, washed with water until the washings no longer gave a barium sulfate precipitate upon treatment with barium chloride solution, and dried to give a yield of 44.8 grams (74.6 percent yield based on copper).

The mother liquor remaining after recovery of the dithiooxamide and the wash water were combined and treated with 296 grams (2.90 moles) of concentrated sulfuric acid. The brown precipitate which formed was filtered off, the filtrate was discarded, and the precipitate slurried with just enough water to permit stirring. Upon heating the slurry to boiling and treating with 238 grams of 70 percent nitric acid, nitric oxide gas was liberated and a solution of cupric nitrate and cupric sulfate was formed. This solution was treated with 61 grams (3.6 moles) of anhydrous ammonia until the first formed precipitate just dissolved and then analyzed for tetramminecopper (II) ion. The analysis indicated that the solution was 0.986 molar in tetramminecopper (II) ion. Seven hundred and eighty milliliters of this solution was employed to prepare dithiooxamide in an identical manner to that described immediately above and the yield was 35.2 grams of dithiooxamide (76.0 percent yield based on copper).

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A process for preparing dithiooxamide which comprises (1) adding a cupric tetrammine salt of the formula $$[Cu(NH_3)_4](X)_n$$

wherein X is a member selected from the group consisting of sulfate, nitrate, bromide, chloride and acetate and $n$ is 1 when X is sulfate and otherwise is 2, to a cyanide salt selected from the group consisting of ammonium cyanide, sodium cyanide, potassium cyanide, lithium cyanide, cesium cyanide and rubidium cyanide, in the presence of water and a water-miscible lower alkanol of 1 to 4 carbon atoms, while maintaining the temperature in the range from about −5° C. to about 50° C., the relative proportions of said cupric tetrammine salt and said cyanide salt being such as to rovide a molar ratio of cupric to cyanide ion of from about 0.1 to about 1; (2) introducing into the reaction mixture at a temperature in the range from about −5° C. to about 50° C. a member selected from the group consisting of sodium hydrosulfide, potassium hydrosulfide, hydrogen sulfide and ammonium sulfide in an amount sufficient to provide a molar ratio of sulfide to cupric ion of from about 1.2 to about 3; and (3) recovering the dithiooxamide which precipitates from the reaction mixture, with the proviso that when a hydrosulfide is employed the reaction mixture is acidified by addition of an acid having a $K_a$ value of greater than $3\times10^{-10}$ to precipitate the dithiooxamide.

2. A process for preparing dithiooxamide which comprises (1) adding (a) an aqueous solution of a cupric tetrammine salt of the formula:

$$[Cu(NH_3)_4](X)_n$$

wherein X is a member selected from the group consisting of sulfate, nitrate, bromide, chloride and acetate and $n$ is 1 when X is sulfate and otherwise is 2, containing at least about 0.05 part of said cupric tetrammine salt per part of water by weight, to (b) an aqueous alcoholic solution of a cyanide salt selected from the group consisting of ammonium cyanide, sodium cyanide, potassium cyanide, lithium cyanide, cesium cyanide and rubidium cyanide, said aqueous alcoholic solution consisting essentially of about 0.1 to about 5 parts of alcohol and about 0.1 to about 1 part of said cyanide salt per part of water by weight and said alcohol being a water-miscible lower alkanol of 1 to 4 carbon atoms, over a period of from about 20 to about 100 minutes while maintaining the temperature in the range from about −5° C. to about 50° C., the relative proportions of said aqueous solution of cupric tetrammine salt and said aqueous alcoholic solution of cyanide salt being such as to provide a molar ratio of cupric to cyanide ion of from about 0.1 to about 1; (2) combining with the admixture of (a) and (b) at a temperature in the range from about −5° C. to about 50° C. a member selected from the group consisting of sodium hydrosulfide, potassium hydrosulfide, hydrogen sulfide and ammonium sulfide in an amount sufficient to provide a molar ratio of sulfide to cupric ion of from about 1.2 to about 3; and (3) recovering the dithiooxamide which precipitates from the reaction mixture, wi.h the proviso that when a hydrosulfide is employed the reaction mixture is acidified by addition of an acid having a $K_a$ value of greater than $3\times10^{-10}$ to precipitate the dithiooxamide.

3. A process for preparing dithiooxamide which comprises (1) adding (a) an aqueous solution of a cupric tetrammine salt of the formula:

$$[Cu(NH_3)_4](X)_n$$

wherein X is a member selected from the group consisting of sulfate, nitrate, bromide, chloride and acetate and $n$ is 1 when X is sulfate and otherwise is 2, containing at least about 0.1 part of said cupric tetrammine salt per part of water by weight, to (b) an aqueous alcoholic solution of a cyanide salt selected from the group consisting of ammonium cyanide, sodium cyanide, potassium cyanide, lithium cyanide, cesium cyanide and rubidium cyanide, said aqueous alcoholic solution consisting essentially of about 0.3 to about 0.7 part of alcohol and about 0.3 to about 0.7 part of said cyanide salt per part of water by weight and said alcohol being a water-miscible lower alkanol of 1 to 4 carbon atoms, over a period of from about 30 to about 60 minutes while maintaining the temperature in the range from about 5° C. to about 15° C., the relative proportions of said aqueous solution of cupric tetrammine salt and said aqueous alcoholic solution of cyanide salt being such as to provide a molar ratio of cupric to cyanide ion of from about 0.2 to about 0.3; (2) combining with the admixture of (a) and (b) at a temperature in the range from about 5° C. to about 15° C. a member selected from the group consisting of sodium hydrosulfide, potassium hydrosulfide, hydrogen sulfide and ammonium sulfide in an amount sufficient to provide a molar ratio of sulfide to cupric ion of from about 1.4 to about 1.8; and (3) recovering the dithiooxamide which precipitates from the reaction mixture, with the proviso that when a hydrosulfide is employed the reaction mixture is acidified by addition of an acid having a $K_a$ value of greater than $3 \times 10^{-10}$ to precipitate the dithiooxamide.

4. A process for preparing dithiooxamide which comprises (1) adding (a) an aqueous solution of cupric tetrammine sulfate containing at least about 0.1 part of cupric tetrammine sulfate per part of water by weight to (b) an aqueous alcoholic solution of sodium cyanide, said aqueous alcoholic solution consisting essentially of about 0.3 to about 0.7 part of ethanol and about 0.3 to about 0.7 part of sodium cyanide per part of water by weight, over a period of from about 30 to about 60 minutes while maintaining the temperature in the range from about 5° C. to about 15° C., the relative proportions of said aqueous solution of cupric tetraamine sulfate and said aqueous alcoholic solution of sodium cyanide being such as to provide a molar ratio of cupric to cyanide ion of from about 0.2 to about 0.3; (2) combining sodium hydrosulfide with the admixture of (a) and (b) within about 1 minute after the addition is complete and at a temperature in the range from about 5° C. to about 15° C., in an amount sufficient to provide a molar ratio of sulfide to cupric ion of from about 1.4 to about 1.8, and acidifying the reaction mixture by addition of an acid having a $K_a$ value of greater than $3 \times 10^{-10}$; and (3) recovering the dithiooxamide which precipitates from the reaction mixture.

5. The process of claim 2 further comprising the steps of acidifying the mother liquor remaining after recovery of the dithiooxamide with a non-oxidizing acid having a $K_a$ value of greater than $9 \times 10^{-8}$ at a temperature of about 0° C. to about 60° C. with an equivalents ratio of non-oxidizing acid to cuprous ion of from about 2.5 to 3.5 to precipitate cuprous sulfide, slurrying the cuprous sulfide in water and heating to reflux at a molar ratio of water to cuprous ion from 0.25 to about 6, heating said slurry to reflux, oxidizing the cuprous sulfide to cupric sulfate by treatment with an oxidizing acid selected from the group consisting of nitric acid and perchloric acid at a temperature of about 20° C. to about 100° C., converting the cupric sulfate to cupric tetrammine sulfate by reaction with ammonia, and recycling the cupric tetraamine sulfate for use in step (1).

6. The process of claim 5 wherein the non-oxidizing acid is sulfuric acid and the cuprous sulfide is oxidized to cupric sulfate by reaction with nitric acid.

7. The process of claim 5 further comprising the steps of distilling from the acidified mother liquor a mixture of hydrogen cyanide, alcohol and water after treatment of the mother liquor with said non-oxidizing acid, absorbing said mixture in a member selected from the group consisting of ammonium hydroxide and an alkali metal hydroxide to form a cyanide salt, and recycling said cyanide salt for use in step (1).

References Cited

FOREIGN PATENTS 868,908 7/1949 Germany.

OTHER REFERENCES

Formanek: Berichte, vol. 22, p. 2655 (1889).
Kruger: Chem. Zentralblat (1926), IIp-2158.

HENRY R. JILES, *Primary Examiner.*

WALTER A. MODANCE, NORMA S. MILESTONE, *Examiners.*

H. I. MOATZ, *Assistant Examiner.*